US012460328B2

(12) United States Patent
Scott

(10) Patent No.: US 12,460,328 B2
(45) Date of Patent: Nov. 4, 2025

(54) POM-SHAKING DEVICE

(71) Applicant: Aegis Scott, Marianna, FL (US)

(72) Inventor: Aegis Scott, Marianna, FL (US)

( * ) Notice: Subject to any disclaimer, the term of this patent is extended or adjusted under 35 U.S.C. 154(b) by 11 days.

(21) Appl. No.: 18/402,947

(22) Filed: Jan. 3, 2024

(65) Prior Publication Data

US 2024/0229310 A1 Jul. 11, 2024

Related U.S. Application Data

(60) Provisional application No. 63/437,819, filed on Jan. 9, 2023.

(51) Int. Cl.

| | |
|---|---|
| ***D04D 7/08*** | (2006.01) |
| ***F21V 23/04*** | (2006.01) |
| ***F21V 33/00*** | (2006.01) |
| ***H04R 1/02*** | (2006.01) |

(52) U.S. Cl.

CPC ........... *D04D 7/08* (2013.01); *F21V 23/0471* (2013.01); *F21V 33/008* (2013.01); *H04R 1/028* (2013.01); *H04R 2201/02* (2013.01)

(58) Field of Classification Search

CPC .......... D04D 7/06; D04D 7/08; F21V 33/008; F21V 23/0471; H04R 1/028

USPC ............ 362/109, 234, 253; 428/4, 5; 28/147

See application file for complete search history.

(56) References Cited

U.S. PATENT DOCUMENTS

| | | | | |
|---|---|---|---|---|
| D272,550 | S | 2/1984 | Esposti | |
| 4,967,321 | A * | 10/1990 | Cimock | A63H 33/00 362/202 |
| 6,012,820 | A * | 1/2000 | Weber | A63B 15/02 446/485 |
| 7,182,483 | B2 * | 2/2007 | Stern | D04D 7/06 362/253 |
| 7,993,711 | B2 | 8/2011 | DeMoor | |
| 8,864,354 | B2 * | 10/2014 | Lorati | F21V 33/0004 362/565 |
| 9,187,850 | B1 | 11/2015 | Sheffer | |
| 2009/0163330 | A1 | 6/2009 | Leetham | |
| 2009/0311446 | A1 | 12/2009 | DeMoor | |
| 2012/0183703 | A1 | 7/2012 | Beaulieu | |

* cited by examiner

*Primary Examiner* — Thomas M Sember

(74) *Attorney, Agent, or Firm* — Brennan, Manna & Diamond, LLC

(57) ABSTRACT

The present invention relates to a pom-shaking device primarily comprised of a first end having at least one housing and at least one pom streamer and a second end comprised of at least one handle. The housing may be hollow and filled with at least one bead that produces a sound when the housing is shaken. The device may also have at least one light and at least one speaker that is activated when the device is shaken to produce a sound and an illumination pattern.

8 Claims, 2 Drawing Sheets

POM-SHAKING DEVICE

CROSS-REFERENCE TO RELATED APPLICATION

The present application claims priority to, and the benefit of, U.S. Provisional Application No. 63/437,819, which was filed on Jan. 9, 2023, and is incorporated herein by reference in its entirety.

FIELD OF THE INVENTION

The present invention relates generally to the field of hand-held entertainment devices. More specifically, the present invention relates to a pom-shaking device primarily comprised of a first end having at least one housing and at least one pom streamer and a second end comprised of at least one handle. The housing may be hollow and filled with at least one bead that produces a sound when the housing is shaken. The device may also have at least one light and at least one speaker that is activated when the device is shaken to produce a sound and an illumination pattern. Accordingly, the present disclosure makes specific reference thereto. Nonetheless, it is to be appreciated that aspects of the present invention are also equally applicable to other like applications, devices, and methods of manufacture.

BACKGROUND

Cheerleaders and other entertainers are often present at sporting events, parties, festivals, concerts, and other events of the like. Said events often lack a fun and exciting way for said individuals to gain the attention of a crowd. In addition, said events often lack devices that provide fans with a fun and unique way to celebrate the event. More specifically, fans at sporting events may lack a device that can be used to showcase their fandom and sportsmanship.

Therefore, there exists a long-felt need in the art for a device that can be used by cheerleaders, other entertainment, and fans at various events. More specifically, there exists a long-felt need in the art for a pom-shaking device that can be used by cheerleaders and other entertainers at events to gain the attention of a crowd in an exciting manner. There also exists a long-felt need in the art for a pom-shaking device that can be used by fans at a sporting event to showcase their fandom and sportsmanship.

The subject matter disclosed and claimed herein, in one embodiment thereof, comprises a pom-shaking device primarily comprised of a first end having at least one housing and at least one pom streamer and a second end comprised of at least one handle. The first end is comprised of at least one housing that is preferably bulbous in shape, wherein the pom streamer is positioned on the housing. In one embodiment, the housing may be hollow and filled with at least one bead that produces a sound when the housing is shaken. The device may also have at least one light and at least one speaker that is activated when the device is shaken to produce a sound and an illumination pattern.

In this manner, the pom-shaking device of the present invention accomplishes all the foregoing objectives and provides a pom-shaking device that can be used by cheerleaders and other entertainers at various events to gain the attention of a crowd in an exciting manner. The device also can be used by fans at a sporting event to showcase their fandom and sportsmanship. As a result, the device provides a novel device that increases the fan and entertainer experience.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pom-shaking device primarily comprised of a first end having at least one housing and at least one pom streamer and a second end comprised of at least one handle. The first end is comprised of at least one housing that is preferably bulbous in shape.

The outer surface of the housing is comprised of at least one pom streamer. The pom streamer is preferably made from a plastic material and is fixedly attached to the outer surface via an adhesive or other attachment method. In one embodiment, the housing is hollow. In a further embodiment, the housing is also comprised of at least one bead within an interior space of the hollow housing. In this manner, when the device is shaken the bead produces a sound within the housing. In one embodiment, a user can customize the number of beads in the housing via a removable cap.

The second end of the device is comprised of at least one handle. The handle may be any shape and size known in the art. In one embodiment, the second end of the handle is comprised of a second housing and all other accompanying structures.

The device may also be comprised of at least one light. Further, the device may be comprised of at least one speaker. In one embodiment, the light and speaker may be controlled by at least one button that allows a user to turn the device on/off and control the functions of the button and speaker. In another embodiment, the light and button are activated by at least one motion sensor within the device, such that the light and speaker are automatically activated when the device is shaken/moved during use and the device is powered on.

Accordingly, the pom-shaking device of the present invention is particularly advantageous as it provides a device that can be used by cheerleaders and other entertainers at various events to gain the attention of a crowd in an exciting manner. The device also can be used by fans at a sporting event to showcase their fandom and sportsmanship. In this manner, the pom-shaking device overcomes the limitations of existing entertainment devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
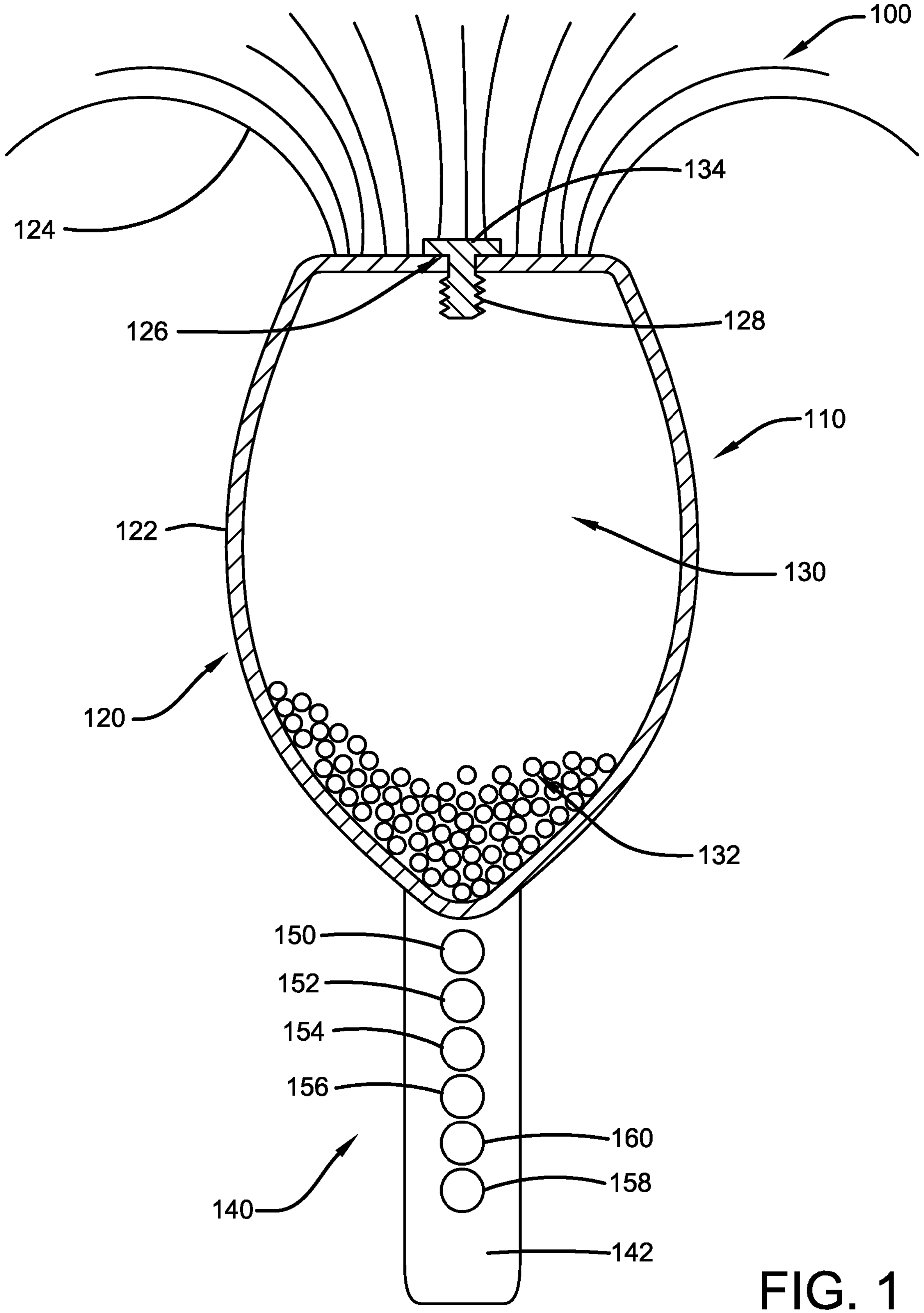
FIG. 1 illustrates a cross-sectional side view of one potential embodiment of a pom-shaking device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that can be used by cheerleaders, other entertainers, and fans at various events. More specifically, there exists a long-felt need in the art for a pom-shaking device that can be used by cheerleaders and other entertainers at events to gain the attention of a crowd in an exciting manner. There also exists a long-felt need in the art for a pom-shaking device that can be used by fans at a sporting event to showcase their fandom and sportsmanship.

The present invention, in one exemplary embodiment, is comprised of a pom-shaking device. The device is primarily comprised of a first end having at least one housing and at least one pom streamer and a second end comprised of at least one handle. The first end is comprised of at least one housing that is preferably bulbous in shape.

The outer surface of the housing is comprised of at least one pom streamer. The pom streamer is preferably made from a plastic material and is fixedly attached to the outer surface via an adhesive or other attachment method. The housing may be hollow and may also be comprised of at least one bead within an interior space of the hollow housing. In this manner, when the device is shaken, the bead produces a sound within the housing. In one embodiment, a user can customize the number of beads in the housing via a removable cap.

The second end of the device is comprised of at least one handle. The handle may be any shape and size known in the art. In one embodiment, the second end of the handle is comprised of a second housing and all other accompanying structures.

The device may also be comprised of at least one light and at least one speaker. In one embodiment, the light and speaker may be controlled by at least one button that allows a user to turn the device on/off and control the functions of the button and speaker. In another embodiment, the light and button are activated by at least one motion sensor within the device, such that the light and speaker are automatically activated when the device is shaken/moved during use and the device is powered on.

Accordingly, the pom-shaking device of the present invention is particularly advantageous as it provides a device that can be used by cheerleaders and other entertainers at various events to gain the attention of a crowd in an exciting manner. The device also can be used by fans at a sporting event to showcase their fandom and sportsmanship. In this manner, the pom-shaking device overcomes the limitations of existing entertainment devices known in the art.

Referring initially to the drawings, FIG. 1 illustrates a cross-sectional side view of one potential embodiment of a pom-shaking device 100 of the present invention in accordance with the disclosed architecture. The device 100 is primarily comprised of a first end 110 having at least one housing 120 and at least one pom streamer 124 and a second end 140 comprised of at least one handle 142. The device 100 and all components of the device 100 may be any color known in the art and may be comprised of at least one indicia 170 such as, but not limited to, patterns, logos, emblems, images, symbols, designs, letters, numbers, words, characters, animals, advertisements, brands, etc. In addition, the device 100 and all components of the device 100 may be reflective, glow in the dark, or have any finish known in the art. The device 100 is preferably made from a lightweight plastic material.

The first end 110 is comprised of at least one housing 120. The housing 120 is preferably bulbous in shape. However, the housing 120 may be any shape in different embodiments. This includes being shaped like any image, object, letter, character, item, symbol, etc., that allows the device 100 and/or housing 120 to relate to the event where it is being used.

The outer surface 122 of the housing 120 is comprised of at least one pom streamer 124. The streamer 124 is preferably rectangular in shape, but may be any shape known in the art. The pom streamer 124 is preferably made from a plastic material and is fixedly attached to the outer surface 122 via an adhesive or other attachment method. The streamer 124 may be any color and may be opaque or transparent. The streamer 124 may also be made from a sparkling or a reflective material.

In one embodiment, the housing 120 is hollow. In a further embodiment, the housing 120 is also comprised of at least one bead 132 within an interior space 130 of the hollow housing 120. In this manner, when the device 100 is shaken, the bead 132 produces a sound within the housing 120. The bead 132 may be any size, shape, and material known in the art.

In one embodiment, a user can customize the number of beads 132 in the housing 120. This embodiment of the device 100 has a housing with at least one opening 126. The opening 126 is secured with a removable cap 134. The opening 126 and fastener 136 may be comprised of any reciprocating fastener 136 type known in the art. This includes, but is not limited to, threads, snap-fasteners, magnets, etc.

The second end 140 of the device 100 is comprised of at least one handle 142. The handle 142 may be any shape and size known in the art. The handle 142 is preferably cylindrical but may be any ergonomic or decorative shape (that may relate to the event where the device 100 is being used).

Figure 2:
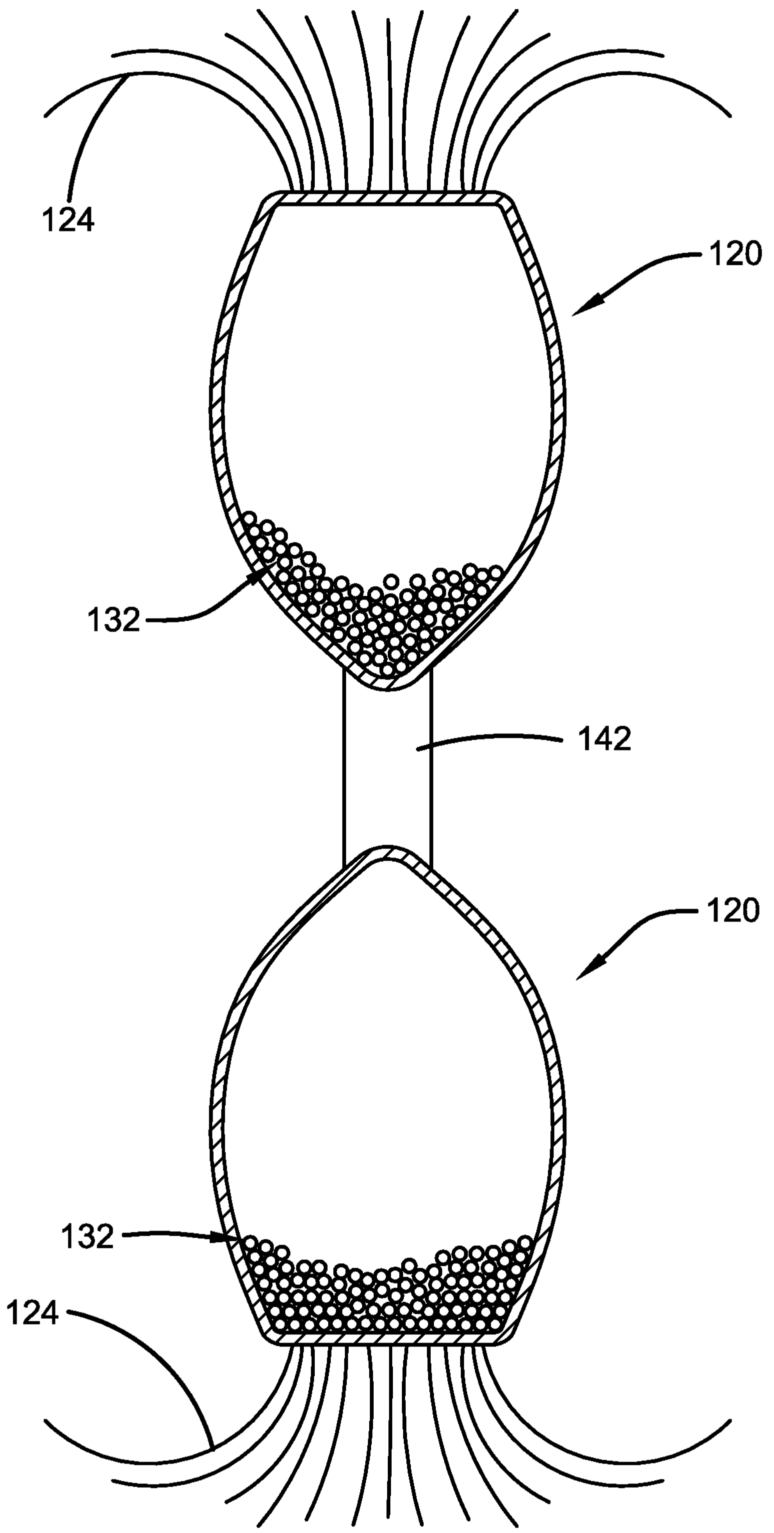
FIG. 2 illustrates a cross-sectional side view of one potential embodiment of a pom-shaking device of the present invention in accordance with the disclosed architecture.

In one embodiment, the second end 140 is comprised of a second housing 120, as seen in FIG. 2. The housing 120 is preferably also bulbous in shape. However, the housing 120 may be any shape in different embodiments. This includes being shaped like any image, object, letter, character, item, symbol, etc.

The outer surface 122 of the housing 120 is comprised of at least one pom streamer 124. The streamer 124 is preferably rectangular in shape, but may be any shape known in the art. The pom streamer 124 is preferably made from a plastic material and is fixedly attached to the outer surface 122 via an adhesive or other attachment method. The streamer 124 may be any color, opaque, or transparent. The streamer 124 may also be made from a sparkling or a reflective material.

In one embodiment, the housing 120 is hollow. In another embodiment, the housing 120 is comprised of at least one bead 132 within an interior space 130 in the housing 120. In this manner, when the device 100 is shaken, the bead 132 produces a sound within the housing 120. The bead 132 may be any size, shape, and material known in the art.

In one embodiment, a user can customize the number of beads 132 in the housing 120. This embodiment of the device 100 has a housing with at least one opening 126. The opening 126 is secured with a removable cap 134. The opening 126 and fastener 136 may be comprised of any reciprocating fastener 136 type known in the art. This includes, but is not limited to, threads, snap-fasteners, magnets, etc.

The device 100 may also be comprised of at least one light 150 of any light type, color, and illumination pattern (such as, but not limited to, a flashing pattern). Further, the device 100 may be comprised of at least one speaker 156. The speaker 156 may produce any sound, song, phrase, etc. Both the light 150 and speaker 156 are powered by a battery 152.

In one embodiment, the light 150 and speaker 156 may be controlled by at least one button 160 that allows a user to turn the device 100 on/off and control the functions of the button 160 and speaker 156. In another embodiment, the light 150 and button 160 are activated by at least one motion sensor 154 within the device 100 that is in wired or wireless electrical communication with the light 150 and speaker 156. As a result, the light 150 and speaker 156 are automatically activated when the device 100 is shaken/moved during use and the device 100 is powered on. The functions of the light 150 and speaker 156 may further be controlled via at least one processor 158.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "pom-shaking device" and "device" are interchangeable and refer to the pom-shaking device 100 of the present invention.

Notwithstanding the foregoing, the pom-shaking device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the pom-shaking device 100 as shown in the FIGS. are for illustrative purposes only, and that many other sizes and shapes of the pom-shaking device 100 are well within the scope of the present disclosure. Although the dimensions of the pom-shaking device 100 are important design parameters for user convenience, the pom-shaking device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pom-shaking device comprising:

a first end comprised of a first housing, the first housing comprised of a first opening, a first cap, and a first bead positioned in the first housing;

a first pom streamer positioned on a first outer surface of the first housing;

a handle;

a light;

a speaker;

a battery;

a button;

a motion sensor;

a second end comprised of a second housing, the second housing comprised of a second opening, a second cap, and a second bead positioned in the second housing; and a second pom streamer positioned on a second outer surface of the second housing.

2. The pom-shaking device of claim 1, wherein the light is activated by the button.

3. The pom-shaking device of claim 1, wherein the light is activated by the motion sensor.

4. The pom-shaking device of claim 1, wherein the speaker is activated by the button.

5. The pom-shaking device of claim 1, wherein the speaker is activated by the motion sensor.

6. The pom-shaking device of claim 1, wherein the speaker produces a sound or a song.

7. The pom-shaking device of claim 1, wherein the light is comprised of an illumination pattern.

8. The pom-shaking device of claim 7, wherein the illumination pattern is comprised of a flashing illumination pattern.

* * * * *